Aug. 7, 1928.
C. G. JOHNSTON
1,679,609
ICE CREAM CONTAINER FILLER
Filed July 20, 1927
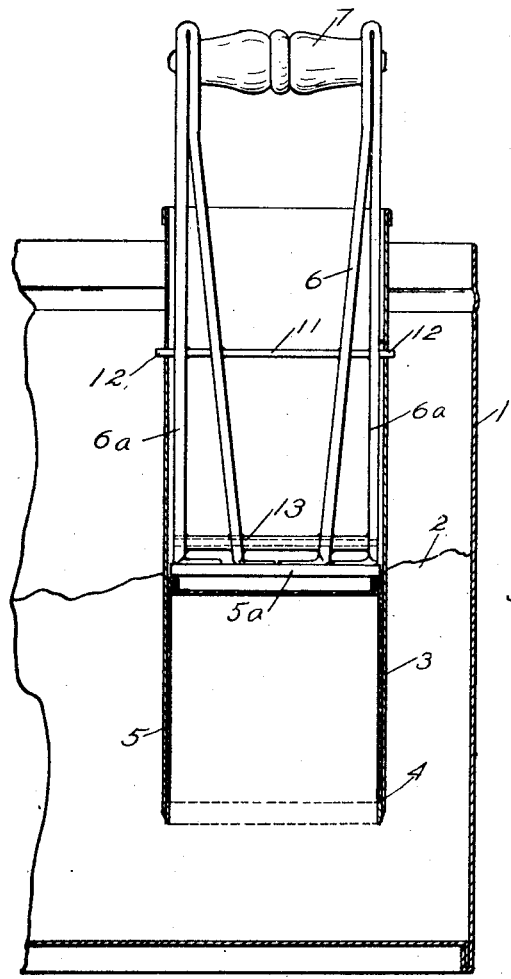
Fig. 1.
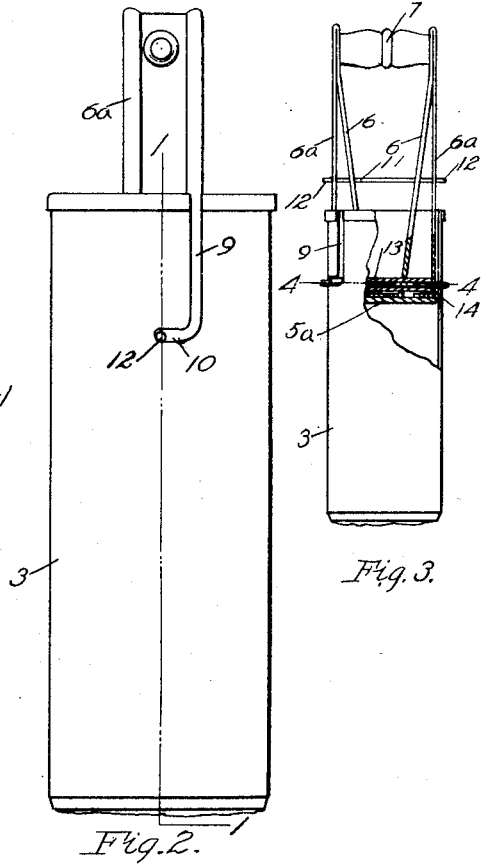
Fig. 2.
Fig. 3.
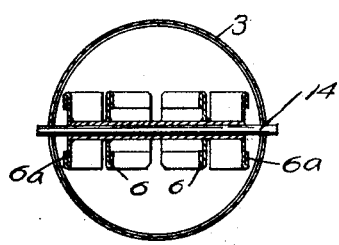
Fig. 4.
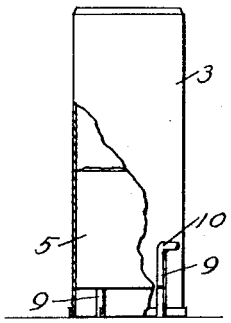
Fig. 5.
INVENTOR.
Cecil G. Johnston
BY
ATTORNEYS.

Patented Aug. 7, 1928.

1,679,609

UNITED STATES PATENT OFFICE.

CECIL G. JOHNSTON, OF MEADVILLE, PENNSYLVANIA, ASSIGNOR OF ONE-HALF TO EDNA B. JOHNSTON, OF MEADVILLE, PENNSYLVANIA.

ICE-CREAM-CONTAINER FILLER.

Application filed July 20, 1927. Serial No. 207,116.

In filling ice cream containers with ice cream it has been common to use some sort of a disher with which the cream is extracted from the can and deposited or packed in the container. This method is quite objectionable in that it involves a very great variation in the quantity of cream delivered depending on the packer. Where the cream is not put in the container with any compression voids are created in the container and where considerable compression is used a greater quantity of cream is placed in the container than should be because of the compressing of the cream and while this gives to the buyer a larger quantity of cream the quality of the cream by reason of the compression is not as desirable. The present invention contemplates the filling of the container directly from the body of cream in the can so that the cream in the container has practically the same density as the cream in the can. The apparatus permits of the filling of the container with very much less labor and in a very much more attractive manner than with the common practice. Features and details of the invention will appear from the specification and claims.

A preferred embodiment of the invention is illustrated in the accompanying drawings as follows:—

Fig. 1 shows a central section of a device operating in a can carrying the cream, the section being on the line 1—1 in Fig. 2.

Fig. 2 a side elevation of the device with the container therein filled with cream.

Fig. 3 a side elevation of the device, partly in section, showing the device adapted to receive a larger container than that shown in Fig. 1.

Fig. 4 a section on the line 4—4 in Fig. 3.

Fig. 5 a side elevation, partly in section, showing the holder removed and inverted to discharge the container.

1 marks the ice cream can containing a body of ice cream with a level indicated at 2. A holder 3 which is in the form of a cylinder of sheet metal is provided and this has a shouldered lip 4. A container 5 is placed in the holder 3 just filling the holder, the bottom edge of the container resting on the lip 4. The lip 4 not only locates the container in the holder but also forms a guard preventing the escape of cream between the container and the side walls of the holder thus depositing cream on the exterior surface of the holder which is objectionable.

A backing $5^a$ is arranged above the container. This is carried by arms 6 and $6^a$ extending downwardly from a handle 7. The arms 6 and $6^a$ being arranged at a slight inclination to each other tend to brace the connection between the handle and backing.

The holder is provided with longitudinal slots 9 which extend from the upper end downwardly and the longitudinal slots 9 terminate in lateral slots 10. A pin 11 extends through the arm 6—$6^a$, the projecting ends 12 operating in the slots 9 and 10. Immediately above the backing $5^a$ a tube 13 is arranged across the arms 6—$6^a$ and this is adapted to receive a pin 14, the ends of which when the pin is in place operate in the slots 9 and are adapted to turn in the slots 10.

In operation, the container is placed in the holder, the backing is put in the holder, above the container, and if a large size container is used, as shown in Fig. 3, the pin 14 is put in place and moved down with the backing in the slots 9 and turned into the horizontal slots 10, thus locking the backing in place above the container. If the small container is used, the pin 14 is removed and the backing is then moved down so as to bring the pin projections 12 into the slots 9 and these are turned into the horizontal slot 10, thus locking the backing above the container of the smaller size as shown in Fig. 1. With the container in position in the holder, the holder is forced downwardly into the body of cream. Sufficient pressure can be readily applied to assure the filling of the container. Then by turning the holder the frictional engagement of the cream with the holder is sufficient to break the body of the cream within the container from the body of the cream in the can, or cream receptacle. The holder is then withdrawn. The backing is given a slight turn bringing the locking pins into register with the slots 9 and the backing then removed. The holder is then reversed as shown in Fig. 4 and with a few taps on the counter the container may be discharged from the holder. In this way the container is filled with cream having the consistency of the mass of cream in the can and thus a uniform quantity of cream is given with each container and at the same time the cream is maintained in the most desirable consistency to make it palatable.

What I claim as new is:—

1. In an ice cream container filler, the combination of a container holder having walls surrounding the container; a stop forming a guard lip at the bottom of the holder; a movable backing arranged in the holder engaging the bottom of the container; and a locking device for the backing comprising a longitudinal slot in the container holder having a lateral extension and a plurality of projections on the backing for varying the position of the backing to different sizes of containers.

2. In an ice cream container filler, the combination of a container holder having a surrounding wall, said surrounding wall having a guard lip at its lower end and a longitudinal slot from which projects a lateral slot; a backing; a tube carried with the backing adapted to receive an adjusting pin for the backing; and a pin in the tube adapted to operate in the slot for locking the backing in place.

3. In an ice cream container filler, the combination of a container holder having walls surrounding the container; means locking the container in position in the holder as the holder is forced into the body of cream comprising an adjustable backing insertable from the rear end of the container and engaging the bottom of the container; and means for locking the backing in different positions in the holder for different sizes of containers.

In testimony whereof I have hereunto set my hand.

CECIL G. JOHNSTON.